United States Patent Office 3,447,106
Patented May 27, 1969

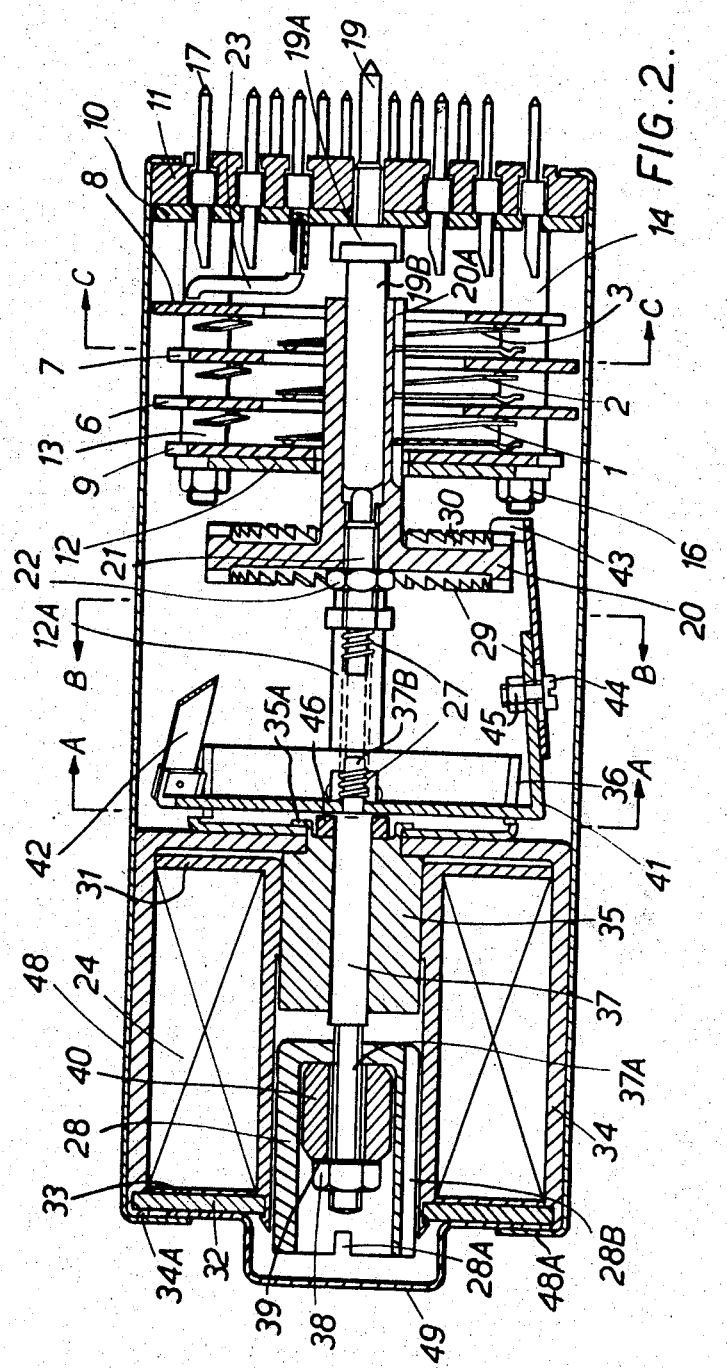

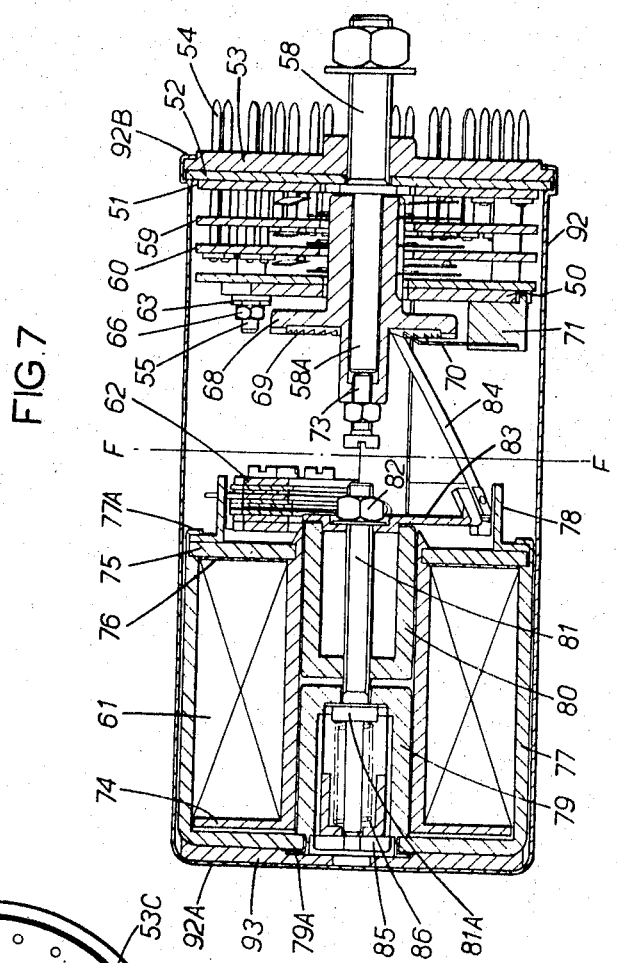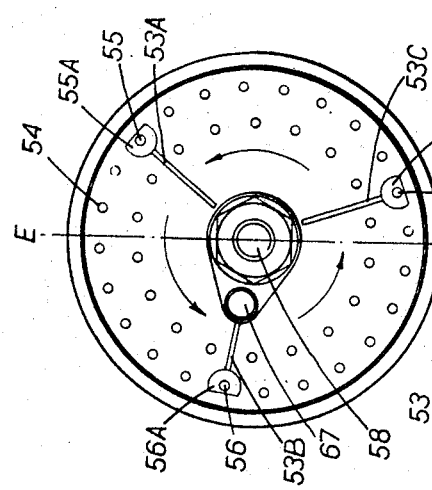

3,447,106
ELECTROMAGNETICALLY-OPERATED RATCHET DRIVEN UNISELECTOR
Khaja Mohiuddin Jameel, London, England, assignor to Associated Electrical Industries Limited, London, England, a British company
Filed Dec. 16, 1966, Ser. No. 602,354
Claims priority, application Great Britain, Jan. 25, 1966, 3,314/66
Int. Cl. H01h 51/02, 51/08
U.S. Cl. 335—140                                8 Claims

ABSTRACT OF THE DISCLOSURE

A miniature uniselector adapted for low-power operation and for performing light-current switching. The uniselector has a rotatable wiper assembly which is ratchet-driven about an axis by means of a solenoid which has a magnetic plunger which is displaceable along the axis. A pawl carried on the magnetic plunger and a cooperating ratchet wheel secured to the wiper assembly act to convert axial displacement of the magnetic plunger into rotary movement of the wiper assembly.

*Background of the invention*

*Field of the invention.*—The field of the invention is elctromagnetically operated ratchet-driven uniselectors. In general, such uniselectors are multioutlet switches, and they have a particular application, for example, as selectors and digit switches in automatic telephone exchanges.

*Description of the prior art.*—Previously known constructions of electromagnetically-operated ratchet-driven uniselector employ a pivoted armature electromagnet for driving the wiper assembly of the uniselector, a pawl carried by the armature being displaced in the same general direction as the direction of rotation of the wiper assembly and engaging with a ratchet wheel of the assembly to drive the latter. However, these previously known constructions cannot be produced readily in miniature form as can a construction of uniselector according to the present invention.

*Summary of the invention*

The invention has as its main object the provision of a form of electromagnetically-operated uniselector, adapted for low-power operation and for performing light-current switching, which:
  (i) Has a substantial number of switching positions (e.g., twelve switching positions),
  (ii) Has an inbuilt driving means capable of responding directly and accurately and reliably to controlling electric pulses or half-waves and enabling the uniselector to be set accurately to, and brought to rest in, any requisite one of the plurality of switching positions, and
  (iii) Is of a very small (subminiature) size and cheap to produce (taking as a basis of comparison uniselectors such as are at present widely employed in automatic telephone switching systems) but nevertheless has an effective life (expressed as a number of operations) of several million operations.

The invention achieves this object by providing an improved form of electromagnetically-operated ratchet-driven uniselector that is well adapted for economic manufacture (by mass production methods) in very small sizes, and that enables an adequate effective life to be obtained by the expedient of striking a suitable balance between effective life and speed of operation. In the case of one particular preferred specific embodiment of the invention that is a ratchet-driven uniselector of the reverse-drive type, and that incorporates an interrupter contact arrangement for self-driving of the uniselector, and that has three wipers each co-operating with a corresponding row of twelve bank contacts, the size is such that the uniselector occupies a cylindrical space about 1.25 inches in diameter and about 3.0 inches long, and the performance is such that the uniselector will respond accurately and reliably to alternating or pulsating driving current obtained from the 50-cycles-per-second public supply mains, the speed of operation being 100 steps per second if it is arranged that half-waves of both polarities are effective and 50 steps per second if it is arranged that only half-waves of one particular polarity are effective. The performance is further such that speeds of operation up to 80 steps per second can be obtained in respect of operation from a direct current pulse generator, and that self-driving speeds of the order of 120 steps per second can be obtained.

According to the main feature of the invention, there is provided an electromagnetically-operated ratched-driven uniselector wherein the wipers are included in a rotatable wiper assembly that includes a ratchet wheel embodying a driving ratchet and forming part of the driving means of the uniselector, and wherein the axis of rotation of this assembly and the axis of a driving solenoid of said driving means are substantially in alignment.

According to one important subordinate feature of the invention, in the case of a forward-drive uniselector the ratchet wheel embodying the driving ratchet is a contrate wheel having the teeth that constitute the driving ratchet formed as teeth that project, relative to their roots, towards the driving solenoid, and this solenoid, upon its effective energisation, produces an axial displacement of a magnetic plunger towards said rachet wheel from a normal position and against the action of a restoring spring, and each such displacement of the magnetic plunger effects a rotary step of the rotatable wiper assembly by producing a driving engagement of a springy driving pawl, carried by the magnetic plunger or a part that moves with this plunger, with the driving ratchet, the driving pawl serving to convert the axial movement of the magnetic plunger into rotational movement of the ratchet wheel and thus the wiper assembly.

According to another important subordinate feature of the invention, in the case of a forward-drive uniselector the ratchet wheel embodying the driving ratchet is a contrate wheel having the teeth that constitute the driving ratchet formed as teeth that project, relative to their roots, towards the driving solenoid, and having further teeth which constitute a retaining ratchet distinct from the driving ratchet and which are formed as teeth that project in the opposite direction relative to their roots, and the driving solenoid, upon its effective energisation, produces an axial displacement of a magnetic plunger towards said ratchet wheel from a normal position and against the action of a restoring spring, and each such displacement of the magnetic plunger firstly produces the removal of a retaining latch, carried by the magnetic plunger or a part that moves with this plunger, from latching engagement with the retaining ratchet, and then effects a rotary step of the rotatable wiper assembly by producing a driving engagement of a springy driving pawl, carried by the magnetic plunger or a part that moves with this plunger, with the driving ratchet, the driving pawl serving to convert the axial movement of the magnetic plunger into rotational movement of the ratchet wheel and thus the wiper assembly.

According to a further important subordinate feature of the invention, in the case of a reverse-drive uniselector the ratchet wheel embodying the driving ratchet is a contrate wheel having the teeth that constitute the driving ratchet formed as teeth that project, relative to their roots, towards the driving solenoid, and this solenoid, upon its effective energisation, produces an axial displacement of a magnetic plunger away from said ratchet wheel from a normal position and against the action of a restoring spring, and the restoration of the magnetic plunger to its normal position, upon the deenergisation of the driving solenoid following its effective energisation, effects a rotary step of the rotatable wiper assembly by producing a driving engagement of a springy driving pawl, carried by the magnetic plunger or a part that moves with this plunger, with the driving ratchet, the driving pawl serving to convert the axial movement of the magnetic plunger into rotational movement of the ratchet wheel and thus the wiper assembly.

According to a still further important subordinate feature of the invention, the driving solenoid is of the shell type and has its winding effectively totally enclosed by ferromagnetic members of the magnetic circuit.

Brief description of the drawings

The previously-mentioned and other features of the invention are exemplified in the two specific embodiments of it which will now be described with reference to the accompanying drawings.

FIGS. 1 to 5 of the drawings pertain to an electromagnetically-operated ratchet-driven uniselector that forms a first one of the two specific embodiments referred to, and which is of the forward-drive type. FIG. 1 is a rear end view of the uniselector, and FIG. 2 is a sectional view, the section being taken on the line D—D in FIG. 1 and looking to the right in that figure. FIGS. 3, 4 and 5 are further sectional views of the uniselector. In the case of FIGS. 3 and 5, the sections are taken on the lines A—A and C—C respectively in FIG. 2 and looking to the right in that figure, while in the case of FIG. 4 the section is taken on the line B—B in FIG. 2 and looking to the left in that figure.

FIGS. 6 to 9 of the drawings pertain to an electromagnetically-operated ratchet-driven uniselector that forms the second of the two specific embodiments referred to, and which is of the reverse-drive type. FIG. 6 is a rear end view of the uniselector, and FIG. 7 is a sectional view, the section being taken on the line E—E in FIG. 6 and looking to the right in that figure. FIGS. 8 and 9 are further sectional views of the uniselector. In the case of FIG. 8, the section is taken on the line F—F in FIG. 7 and looking to the right in that figure, while in the case of FIG. 9 the section is also taken on the line F—F in FIG. 7 but looking to the left in that figure.

Description of the preferred embodiments

Figure 1:
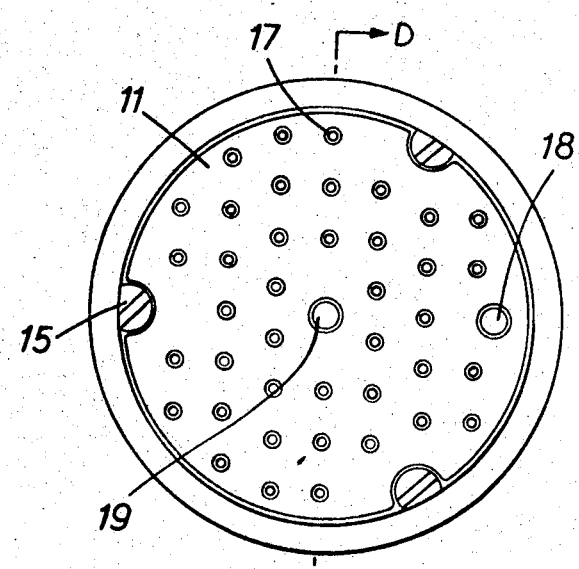
Figure 3:
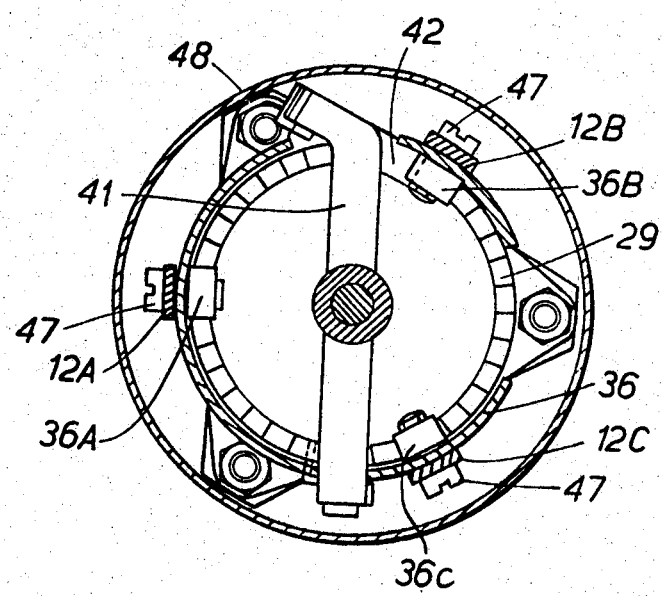
Figure 4:
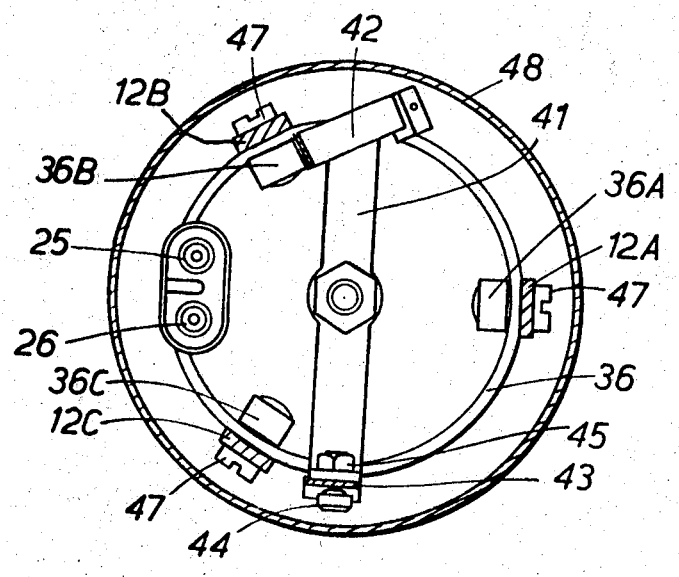
Figure 5:
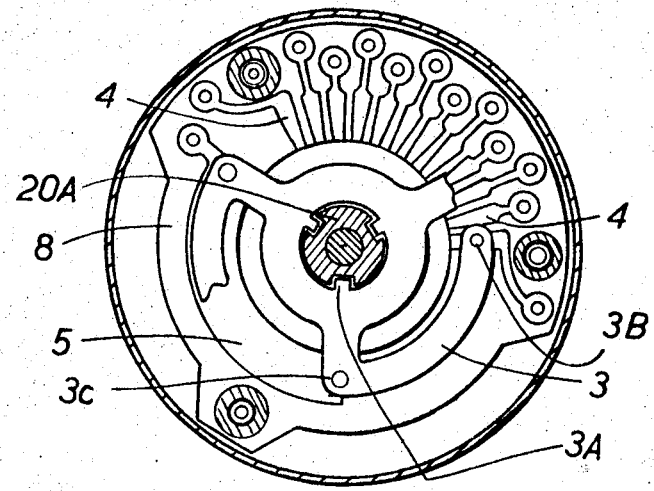

Referring firstly to FIGS. 1 to 5 of the drawings, the uniselector to which these figures pertain, and which forms the first of the two specific embodiments referred to, and which is of the forward-drive type, has three wipers 1, 2 and 3 (FIGS. 2 and 5) each cooperating with a corresponding row of twelve outlet contacts, and occupies a cylindrical space about 1.25 inches in diameter and about 3.25 inches long. The three wipers are similar to one another and of a three-armed type. In FIG. 5, wiper 3 is shown with one of its three arms almost entirely broken away, and another of these arms partly broken away, in order to cause the form of the twelve outlet contacts 4 with which the wiper cooperates, and of a feeder contact 5 pertaining to this wiper, to be more clearly revealed in the view seen in the figure. The twelve outlet contacts of a row, and the feeder contact pertaining to the wiper that cooperates with these twelve outlet contacts, are coplanar, and are carried by an insulating plate or wafer 6, 7 or 8 (FIGS. 2 and 5) and stand proud, by their thickness, from the relevant flat surface of this plate or wafer. They are formed of copper, and have their external contact surfaces plated with gold or other suitable precious metal. The three insulating plates or wafers 6, 7 and 8, a further insulating plate or wafer 9 that carries no contact, and an insulating disc 10 are secured, in their correct relative positions, to an insulating end plate 11 (FIGS. 1 and 2) to form a contact bank assembly. The securing of the parts 6 to 10 to the end plate 11 is effected in a simple and straight-forward manner by clamping and securing means comprising a clamping and coupling member 12, spacing bushes such as 13 and 14, screws 15 and nuts 16. As will be referred to later on in this description, the clamping and coupling member 12, which has three arms 12A, 12B and 12C (FIGS. 2, 3 and 4), serves for securing together, in their correct relative positions, the contact bank assembly and a further assembly that may conveniently, since it includes a driving solenoid, be termed the driving solenoid assembly of the uniselector. Held securely in posiiton in the end plate 11 by the insulating disc 10 are forty-one contact pins comprising forty contact pins 17 of one size and one contact pin 18 (FIG. 1) of a somewhat larger size, while screwed into the centre of the end plate 11 is a spindle and pin member 19 (FIGS. 1 and 2). The member 19 has an intermediate portion 19A which is formed with flats to facilitate the screwing of the member into position by means of a suitably shaped screwdriver. A spindle portion 19B of the member 19 serves as a fixed spindle for a rotatable wiper assembly comprising the wipers 1, 2 and 3, a ratchet wheel 20, an adjusting and spring-locating pin 21, and a lock nut 22. Thirty-nine of the contact pins serve as individual exterior terminals for the thirty-six outlet contacts and three feeder contacts carried by the three insulating plates or wafers 6, 7 and 8. Soldered wire connections connect the outlet contacts and feeder contacts to the corresponding contact pins. In order to avoid undesirable complication in the drawing, only one typical such soldered wire connection, designated 23, is shown in the drawing (see FIG. 2). A fairly orderly and unentangled distribution of these soldered wire connections, such that they are all adequately clear of the wipers 1, 2 and 3, is facilitated by the fact that the three insulating plates or wafers 6, 7 and 8 are assembled so that each plate or wafer is as it were displaced rotarily by 120° with reference to each of the remaining two (it is this relative displacement which causes the three plates or wafers to look distinguishably different from one another in the view shown in FIG. 2). In the manufacture of the uniselector, these soldered wire connections connecting the outlet contacts and feeder contacts to the corresponding contact pins are made at an intermediate stage in the assembling together of the parts of the contact bank assembly to form this assembly. The remaining two of the forty-one contact pins serve as exterior terminals for the driving solenoid 24 (FIG. 2) of the driving solenoid assembly. Soldered wire connections (not shown) connect two terminals 25 and 26 (FIG. 4) of the solenoid to the corresponding contact pins. The end plate 11, and the spindle and pin member and forty-one contact pins secured in position in this plate, constitute a 42-pin plug adapted for insertion into a suitable 42-pin socket. The projecting pin portions proper of the contact pin 18 and of the spindle and pin member 19, being of somewhat larger size than the projecting pin portions proper of the forty contact pins 17, serve as locating and orientation pins.

The ratchet wheel 20, which is a moulding formed of a suitable plastics material, has an extended central portion 20A which is a running fit on the spindle portion 19B of the spindle and pin member 19 and which passes through central holes (see FIG. 5) in the wipers 1, 2 and 3. The extended central portion 20A of the ratchet wheel is formed with three equidistantly spaced longitudinal grooves or keyways in which register (see FIG. 5) corresponding keying portions such as 3A (FIG. 5) of the wipers. So far as the ratchet wheel and the wipers are concerned, the rotatable wiper assembly is such that rotary movement of the ratchet wheel effects a corresponding movement of the wipers, but the wipers are not secured to the ratchet wheel in a manner that obstructs relative movements in the axial direction. The axial position of the ratchet wheel with reference to the spindle and pin member 19 is determined by the abutment, under the influence of a spring 27 (FIG. 2), of the rounded end of the adjusting and spring-locating pin 21 with the end of the spindle portion 19B of the member 19. The spring 27, which is always under compression, serves as a restoring spring for a magnetic plunger 28 of the driving solenoid assembly. During the assembling together of the parts of the uniselector during manufacture, the extent to which a threaded central portion of the pin 21 is screwed into a correspondingly threaded portion of the central passage through the ratchet wheel, is adjusted, with the lock nut 22 screwed back out of the way, until a setting of the pin is achieved that provides the correct axial positioning of the ratchet wheel with reference to the spindle and pin member 19, after which the lock nut 22 is advanced and tightened to lock the pin 21 in this setting. As has already been stated, the three wipers 1, 2 and 3 are similar to one another and of a three-armed type. Each wiper has three contact pips proper, such as the contact pip 3B (viewed from behind in FIG. 5). Each wiper also has a further three contact pips, such as the contact pip 3C (FIG. 5), which are contact pips that do not serve as electrical contact elements but which merely slide over the surface of the relevant one of the insulating plates or wafers 9, 6 and 7. In the case of each wiper, the three contact pips proper of the wiper are located one near the extremity of each arm of the wiper, while the remaining three contact pips of the wiper are located one in each arm of the wiper in a position remote from the extremity of the arm. The arms of the wiper 1 are suitably tensioned by reason of the fact that the wiper is squeezed between the plates or wafers 9 and 6, while in the case of the wipers 2 and 3 corresponding tensioning results from the squeezing of the wiper 2 between the plates or wafers 6 and 7 and from the squeezing of the wiper 3 between the plates or wafers 7 and 8. During rotation of the rotatable wiper assembly through 120°, each wiper connects each of the relevant twelve outlet contacts 4 in turn to the feeder contact 5 pertaining to the wiper. The ratchet wheel 20 is a contrate wheel having teeth that constitute a driving ratchet 29 formed as teeth that project, relative to their roots, towards the driving soleniod 24 (FIG. 2), and having further teeth which constitute a retaining ratchet 30 and which are formed as teeth that project in the opposite direction relative to their roots.

Referring now to the driving solenoid assembly of the uniselector, the winding of the driving solenoid 24 is wound on a spool made up of a former 31 composed of a suitable plastics insulating material, a soft-iron end cheek 32, and a thin insulating end cheek 33, the end cheek 32 being secured in position on the former 31 by being sprung into a groove in the latter. The wound spool is contained within a soft-iron pot member 34, and is permanently secured in this member by the spun-over edge 34A of the member. Within the former 31, at the end nearer the ratchet wheel 20, is a mainly cylindrical soft-iron core member 35. This core member 35, and a flanged coupling member 36 (FIGS. 2, 3 and 4), are permanently secured to the pot member 34 by the spun-over edge 35A of the core member. The magnetic plunger 28 of the driving solenoid assembly normally lies mainly, but not wholly, within the former 31, and its general form is that of a hollow cylinder open at one end. It is composed of soft-iron, and is a free fit in the former 31, and is secured to, and supported in position by, a Phosphor-bronze push rod 37, which is sliding fit in a central, axial, hole in the core member 35. By reason of its hollow form, the plunger is advantageously light in weight. During the assembling together of the parts of the uniselector during manufacture, the length of the operating air-gap between the soft-iron core member 35 and the soft-iron plunger 28 is adjusted to a requisite value by adjusting the extent to which the plunger is screwed onto the threaded end portion 37A of the push rod 37. The plunger has a slot 28A in its edge to facilitate the screwing of the plunger along the threaded end of the push rod. A lock nut 38, washer 39, and resilient nylon sleeve 40 serve to lock the plunger in its set position on the push rod. A longitudinal groove 28B in the outer cylindrical surface of the plunger allows free escape of air from the operating air-gap when the plunger is attracted towards the core member 35, and prevents the occurrence of any cushioning effect due to trapped air. Secured to the push rod 37, at the end nearer the ratchet wheel 20, is a metal bracket member 41 (FIGS. 2, 3 and 4) which carries a springy driving pawl 42, and a retaining latch 43. The end portion 37B of the push rod 37 forms a locating pin for the spring 27. The bracket member 41 is firmly secured in position on the end portion 37B of the push rod by being screwed thereon and by a web of solder. The driving pawl 42 is permanently secured to the bracket member 41 by a small clamping angle member and a rivet, while the latch 43 is secured to the bracket member 41, in a manner permitting adjustment of the latching engagement of the latch with the retaining ratchet 30, by a bolt 44 and nut 45. A resilient (e.g., rubber) collar 46 (FIG. 2), carried by the push rod 37 and located between the core member 35 and the bracket member 41, serves as a cushion upon the return of the plunger to its normal position from its operated position under the influence of the spring 27. The flange of the flanged coupling member 36 has, of course, to have slots or gaps in it to accommodate, with adequate freedom of movement, the bracket member 41 and the parts carried by this bracket member. It will be seen that the driving solenoid 24 is of the shell type and has its winding effectively totally enclosed by ferro-magnetic members 28, 32, 34 and 35 of the magnetic circuit.

The clamping and coupling member 12, with its three arms 12A, 12B and 12C (FIGS. 2, 3 and 4), the flanged coupling member 36 (FIGS. 2, 3 and 4), and three screws 47 serve for securing the driving solenoid assembly and the contact bank assembly together in their correct relative positions. The screws 47 pass through clearance holes in the arms 12A, 12B and 12C, and are screwed home into correspondingly threaded holes in lugs 36A, 36B and 36C carried on the inner surface of the flanged coupling member 36.

The uniselector is a totally enclosed one, the enclosing parts, in addition to the 42-pin plug already referred to, being two light aluminum casing parts 48 and 49. As the final stage in the manufacture of the uniselector, the edge 48A of the main tubular casing part 48 is spun over to secure this part 48, and the end cap 49, permanently in position.

The driving solenoid 24, upon its effective energisation produces an axial displacement of the magnetic plunger 28 from the normal position in which the plunger is shown in FIG. 2, this displacement being towards the ratchet wheel 20 and against the action of the restoring spring 27 and being such as to close the operating air-gap between the soft-iron core member 35 and the plunger. Each such displacement of the magnetic plunger 28 firstly produces the removal of the retaining latch 43 from latching engagement with the retaining ratchet 30, and then effects a rotary step of the rotatable wiper assembly by producing a driving engagement of the springy driving pawl 42 with the driving ratchet 29, the driving pawl serving to convert the axial movement of the magnetic plunger into rotational movement of the ratchet wheel.

Upon the deenergisation of the driving solenoid 24 following its effective energisation, the restoring spring 27 restores the plunger 28 to its normal position and the retaining latch 43 again enters into latching engagement with the retaining ratchet 30 to retain the wipers in position.

In the manufacture of the uniselector, the outlet contacts 4 and the feeder contacts 5 may conveniently be, but need not necessarily be, produced by a printed circuit method of manufacture.

The power needed by the driving solenoid 24 for effective energisation may be of the order of one watt.

Referring now to FIGS. 6 to 9 of the drawings, the description given herein of the uniselector to which these figures pertain, and which forms the second of the two specific embodiments referred to, and which is of the reverse-drive type, will be devoted mainly to a description of those features of construction in which this second embodiment differs significantly from the first embodiment just described.

The uniselector of FIGS. 6 to 9 has three wipers each cooperating with a corresponding row of twelve outlet contacts, and occupies a cylindrical space about 1.25 inches in diameter and about 3.0 inches long. The rotatable wiper assembly and the contact bank assembly are in many respects broadly similar to the rotatable wiper assembly and the contact bank assembly of the first embodiment. A clamping and coupling member 50 (FIGS. 7 and 8) corresponds to the member 12 of the first embodiment, and has three arms 50A, 50B, and 50C and serves for securing the contact bank assembly and the driving solenoid assembly together in their correct relative positions. An insulating plate or wafer 51 (FIG. 7) that corresponds to the plate or wafer 8 of the first embodiment, and an insulating disc 52 that corresponds to the disc 10 of the first embodiment, abut each other and are not spaced apart like the parts 8 and 10 of the first embodiment. Provided in a moulded insulating end plate 53 (FIGS. 6 and 7) are forty-two contact pins comprising thirty-nine simple contact pins 54 and three dual-purpose contact pins 55, 56, and 57 (FIGS. 6, 7 and 8), while screwed into the centre of this end plate 53 is a spindle member 58 that corresponds to the member 19 of the first embodiment. The thirty-nine simple contact pins 54 serve as individual exterior terminals for the thirty-six outlet contacts, and the three feeder contacts, that are carried by the three insulating plates or wafers 51, 59 and 60 of the contact bank assembly. These thirty-nine contact pins comprise thirteen of one length that are directly (i.e., without intermediate wiring) connecetd to respective ones of the contacts (twelve outlet and one feeder) carried by the plate or wafer 51, thirteen of a somewhat longer length that are directly connected to respective ones of the contacts carried by the plate or wafer 59, and thirteen of a still longer or maximum length that are directly connected to respective ones of the contacts carried by the plate or wafer 60. The simple contact pins 54 pertaining to the contacts carried by the plate or wafer 59 pass through clearance holes in the plate or wafer 51, while the simple contact pins 54 pertaining to the contacts carried by the plate or wafer 60 pass through clearance holes in both the plate or wafer 51 and the plate or wafer 59. The three dual-purpose contact pins 55, 56 and 57 serve as the screws (corresponding to the screws 15 of the first embodiment) of the clamping and securing means of the contact bank assembly, and also serve as exterior terminals for the driving solenoid 61 (FIG. 7) of the driving solenoid assembly and for a self-driving circuit that comprises this solenoid in series with an interrupter contact set formed by an interrupter contact arrangement 62. Each of these dual-purpose contact pins has a wiring tag member 63, 64 or 65 (FIG. 8), individual to it and in electrical connection with it, and has a clamping nut 66 screwed on it, and is provided with insulating bushes for insulating it, and its wiring tag member and its clamping nut, from the clamping and coupling member 50. The form of the dual-purpose contact pins is such that each has, where it passes through the end plate 53, a collar portion, 55A or 56A or 57A (FIG. 6), that is of such a shape that it serves to lock the pin against turning. In order to avoid undesirable complication in the drawing, the wire connections to the wiring tag members 63, 64 and 65 are not shown. One of two terminal wires of the driving solenoid 61 is connected to wiring tag member 63 (and is thus electrically connected to contact pin 55), the other of these two terminal wires is connected to wiring tag member 64 (and is thus electrically connected to contact pin 56), and the interrupter contact set is connected between wiring tag member 63 and wiring tag member 65 (i.e., electrically, between contact pins 55 and 57). A non-linear resistance device (not shown), for limiting the inductive voltage produced on the opening of the circuit of the driving solenoid 61, is connected between wiring tag members 63 and 64 (i.e., electrically, across the winding of the solenoid). The end plate 53, the spindle member 58, the forty-two contact pins, and a locating pin 67 (FIG. 6) that is secured in position in the end plate 53, constitute a 42-point plug adapted for insertion into a suitable 42-point socket. As seen in FIG. 6, the end plate 53 is marked out into three portions by three marking elements 53A, 53B and 53C.

Figure 8:
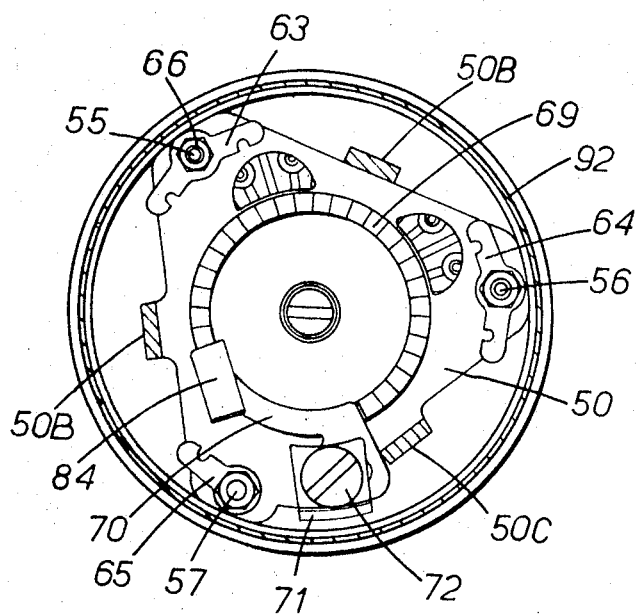
Figure 9:
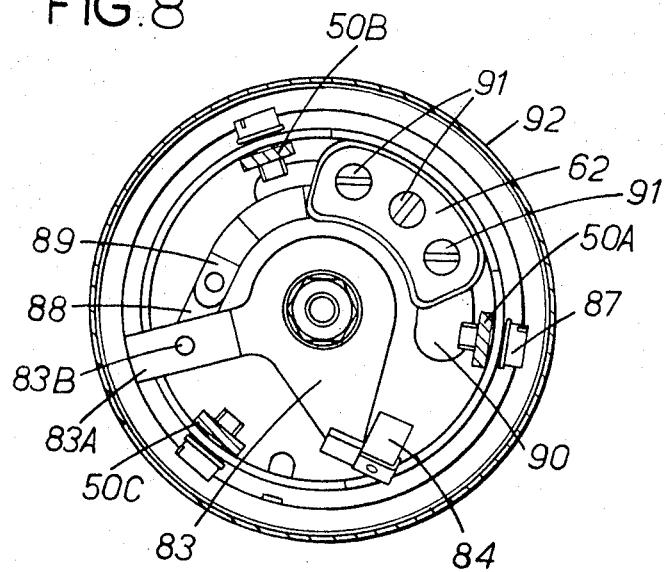

The ratchet wheel 68 of the rotatable wiper assembly, which like the ratchet wheel 20 of the first embodiment is a moulding formed of a suitable plastics material, is a contrate wheel having teeth that constitute a driving ratchet 69 formed as teeth that project, relative to their roots, towards the driving solenoid 61 (FIG. 7). A retaining pawl 70 (FIGS. 7 and 8) that cooperates with the driving ratchet 69 is mounted on the clamping and coupling member 50 by means of a mounting arrangement that comprises a mounting block 71, formed of a suitable plastics material, and a fixing screw 72 (FIG. 8). The axial position of the ratchet wheel 68 with reference to the spindle member 58 is determined by the abutment, under the influence of the retaining pawl 70, of the end of an adjusting pin 73 (FIG. 7) with the end of the spindle portion 58A of the member 58.

Referring now to the driving solenoid assembly of the uniselector, the winding of the driving solenoid 61 is wound on a spool made up of a former 74 composed of a suitable plastics insulating material, a soft-iron end cheek 75, and a thin insulating end cheek 76, the end cheek 75 being secured in position on the former 74 by being sprung into a groove in the latter. The wound spool is contained within a soft-iron pot member 77, and together with a flanged coupling member 78 (corresponding to the member 36 of the first embodiment) is permanently secured to this pot member by the spun-over edge 77A of the pot member. Within the former 74, at the end the more remote from the ratchet wheel 68, is a hollow cylindrical soft-iron core member 79. This core member is permanently secured to the pot member 77 by the spun-over edge 79A of the core member. A magnetic plunger 80 of the driving solenoid assembly normally lies almost wholly within the former 74, and its general form is that of a cylinder open at one end. It is composed of soft-iron, and is a sliding fit in the former 74, and is secured to a Phosphor-bronze push rod 81 which is threaded for a part of its length and which is screwed into the plunger. During the assembling together of the parts of the uniselector during manufacture, the length of the operating air-gap between the soft-iron core member 79 and the soft-iron plunger 80 is adjusted to a requisite value by adjusting the extent to which the push rod 81 is screwed into the plunger. The push rod has a portion 81A of hexagonal section to facilitate the carrying out of such adjustment. Secured to the push rod 81 and the plunger 80 by securing means comprising a washer and a nut 82, and at the end of the push rod that is the nearer to the ratchet wheel 68, is a mild steel bracket member 83 (FIGS. 7 and 9) which closes the open end of the plunger 80 and carries a springy driving pawl 84. The securing of the bracket member 83 to the push rod 81 and plunger 80 by means of the nut 82 serves to lock the plunger in its set position on the push rod. At its outer end (the left-hand end as seen in FIG. 7), the push rod 81 passes through a central hole in a spring-retaining member 85 which is formed of a suitable plastics material, and which is externally threaded to screw into the core member 79, and which serves for retaining, under suitable compression, a spring 86 which serves as a restoring spring for the magnetic plunger 80. The spring-retaining member 85 has a slot in its outer face to facilitate the screwing of this member into the core member 79. Three screws 87 (FIG. 9) pass through clearance slots in the flanged coupling member 78, and are screwed home into correspondingly threaded holes in respective ones of the arms 50A, 50B, and 50C of the clamping and coupling member 50. The bracket member 83, in addition to carrying the driving pawl 84, also serves for operating the interrupter contact set, and for this purpose carries a small plastic striker 83A (FIG. 9), this striker co-operating with a contact spring 88 of the interrupter contact set 62. The interrupter contact set comprises this contact spring 88 and a further contact spring 89 which is somewhat shorter than the contact spring 88. These contact springs are carried, as a simple contact pile-up, by a metal supporting member 90 (FIG. 9) that is secured to the soft-iron end cheek 75 by spot welding, the contact pile-up being secured to the supporting member 90 by three screws 91. The two contact springs 88 and 89 are, of course, normally in contact with each other.

The uniselector is a totally enclosed one, the enclosing parts being the 42-point plug already referred to and a light aluminium tubular casing part 92. As the final stage in the manufacture of the uniselector, the tubular casing part 92 is assembled on the uniselector, with a spongy polystyrene washer 93 intervening between the driving solenoid assembly and the end portion 92A of the casing part, and the edge 92B of the casing part is spun over to secure this part permanently in position.

The driving solenoid 61, upon its effective energisation, produces an axial displacement of the magnetic plunger 80 from the normal position in which the plunger is shown in FIG. 7, this displacement being away from the ratchet wheel 68 and against the action of the restoring spring 86 and being such as to close the operating air-gap between the soft-iron core member 79 and the plunger. Each such displacement of the magnetic plunger 80 pulls the springy driving pawl 84 over one tooth of the driving ratchet 69, and thereby prepares for a driving engagement of the driving pawl with the driving ratchet. The retaining pawl 70 serves, by its engagement with the driving ratchet 69, to ensure that each such displacement of the magnetic plunger 80 produces no significant reverse movement of the ratchet wheel. At a late stage in the movement of the magnetic plunger 80 that is produced upon effective energisation of the driving solenoid 61, the member 83 effects the opening of the interrupter contact set, with a consequent opening of the circuit of, and deenergisation of, the driving solenoid in the case where the uniselector is connected in a self-driving circuit.

Upon the deenergisation of the driving solenoid 61 following its effective energisation, the restoring spring 86 restores the magnetic plunger 80 to its normal position, and this restoration effects a rotary step of the rotatable wiper assembly by producing a driving engagement of the springy driving pawl 84 with the driving ratchet 69, the driving pawl serving to convert the axial movement of the magnetic plunger into rotational movement of the ratchet wheel. Furthermore, the restoration of the magnetic plunger 80 to its normal position allows the interrupter contact set to close, with a consequent fresh closing of the circuit of, and fresh effective energisation of, the driving solenoid in the case where the uniselector is connected in a self-driving circuit.

I claim:
1. An electromagnetically-operated ratchet-driven uniselector comprising:
   (a) a rotatable wiper assembly having a unitary member of electrically conductive material with a plurality of resilient arms equiangularly disposed to one another around the axis of rotation of the wiper assembly, each of said arms having a first portion extending radially from said axis of rotation, a second arcuate portion extending circumferentially from the outer end of said first portion and a contact portion adjacent the free end of said second portion,
   (b) a plate of electrically insulating material mounted at right angles to said axis of rotation,
   (c) a plurality of contacts which are carried on said plate in a first sector thereof that subtends an angle at said axis of rotation that is equal the angular displacement of the arms of said unitary member, said plurality of contacts constituting fixed selectable contacts of the uniselector,
   (d) an arcuate contact carried on a second sector of said plate, said arcuate contact subtending an angle at said axis of rotation which is not less than the angular displacement of the arms of said unitary member, said arcuate contact constituting a fixed common contact of the uniselector,
   (e) means bearing against said unitary member to urge the contact portions of said arms thereof into contact with the contact portions carried on said plate to bridge said fixed common contact and one of the fixed selectable contacts of the uniselector,
   (f) a ratchet wheel connected to said wiper assembly,
   (g) a drawing pawl mounted to engage said ratchet wheel, and
   (h) electromagnetic driving means to displace said driving pawl so as to cause rotation of said ratchet wheel and thereby also cause rotation of said wiper assembly,
the arrangement being such that successive displacements of said driving pawl cause said unitary member to bridge the arcuate contact constituting the fixed common contact of the uniselector and successive ones of the fixed contacts constituting the fixed selectable contacts of the uniselector.

2. An electromagnetically-operated ratchet-driven uniselector as claimed in claim 1, and with multipole switching ability provided by said rotatable wiper assembly comprising a number of said unitary members equal to the number of poles, said uniselector comprising a number of said plates equal to the number of poles, each of said plates carrying fixed common and selectable contacts of respective poles of the uniselector, and means urging the contact portions of the unitary members on to the contacts carried by respective ones of said plates to cause each unitary member to bridge the respective fixed common contact and one of the fixed selectable contacts of one pole of the uniselector.

3. An electromagnetically-operated ratchet-driven uniselector as claimed in claim 1, and further comprising:
   (a) a normally closed contact set,
   (b) means connecting said contact set in series with said electromagnetic driving means,
   (c) means to open said normally closed contact set during said rotation of said wiper assembly,
the arrangement being such that the uniselector is self-driving.

4. An electromagnetically-operated ratchet-driven uniselector as claimed in claim 1, and arranged as a reverse-drive uniselector in which:
   (a) a contrate wheel constitutes said ratchet wheel,
   (b) teeth of said contrate wheel serve as said ratchet wheel and are formed as teeth that project, relative to their roots, towards said electromagnetic driving means, (c) a magnetic plunger is included in said electromagnetic driving means,
(d) connecting means connect said magnetic plunger to said driving pawl,
(e) the magnetic plunger is operable upon effective energisation of said electromagnetic driving means to produce an axial displacement of said driving pawl away from said ratchet wheel from a normal position in which it engages said ratchet wheel,
(f) a restoring spring engages said magnetic plunger to effect restoration of said driving pawl to its normal position upon effective deenergisation of said electromagnetic driving means, the arrangement being such that said restoration of said driving pawl to said normal position under the action of said restoring spring will cause rotation of said ratchet wheel and thereby also cause rotation of said wiper assembly, said driving pawl serving to convert the axial movement which said magnetic plunger makes during said restoration into rotational movement of said ratchet wheel and thus also into rotational movement of said wiper assembly.

5. An electromagnetically-operated ratchet-driven reverse drive uniselector as claimed in claim 4, including a retaining pawl which is in permanent engagement with said ratchet wheel and serves by such engagement to ensure that each displacement of said magnetic plunger produces no significant reverse movement of said ratchet wheel.

6. An electromagnetically-operated ratchet-driven uniselector as claimed in claim 2, wherein said uniselector includes a multipin plug member mounted parallel to said plates, the pins of said plug member being arranged in a circular array substantially coaxial with the axis of rotation of said wiper assembly; and each of the contacts carried on said plates has a terminal portion associated therewith; the plates being mutually angularly aligned round the axis of rotation of the wiper assembly so that electrical conductors connecting the terminal portions of the contacts to respective one of the pins of the plug member may be arranged in a nonentangled relationship.

7. An electromagnetically-operated ratchet-driven forward-drive uniselector comprising:
 (a) a rotatable wiper assembly,
 (b) a ratchet wheel included in said wiper assembly,
 (c) a driving ratchet embodied in said ratchet wheel,
 (d) driving means of the uniselector to rotate the wiper assembly, said driving means comprising a driving solenoid and said driving ratchet, the axis of rotation of the wiper assembly and the axis of said driving solenoid being substantially in alignment, and in which:
 (e) a contrate wheel constitutes said ratchet wheel embodying said driving ratchet,
 (f) teeth of said contrate wheel serve as said driving ratchet and are formed as teeth that project, relative to their roots, towards said driving solenoid,
 (g) further teeth of said contrate wheel serve as a retaining ratchet, distinct from said driving ratchet, and are formed as teeth that project, relative to their roots, away from said driving solenoid,
 (h) a magnetic plunger is included in said driving solenoid,
 (i) said driving solenoid is operable, upon its effective energisation, to produce an axial displacement of said magnetic plunger towards said ratchet wheel from a normal position,
 (j) a restoring spring engages said magnetic plunger to maintain said magnetic plunger in said normal position when said driving solenoid is de-energized;
 (k) a springy driving pawl is mounted to move into driving engagement with said driving ratchet as a result of said axial displacement of said magnetic plunger,
 (l) a retaining latch is mounted to move from latching engagement with said driving ratchet as a result of said axial displacement of said magnetic plunger,
the arrangement being such that said axial displacement of said magnetic plunger from said normal position and against the action of said restoring spring will firstly effect removal of said retaining latch from latching engagement with said retaining ratchet and then effect a rotary step of the rotatable wiper assembly, said driving pawl serving to convert the axial movement of said magnetic plunger into rotational movement of said ratchet and thus also into rotation movement of said wiper assembly.

8. An electromagnetically operated ratchet driven forward-drive uniselector as claimed in claim 7, further comprising:
 (a) a normally closed contact set,
 (b) means connecting said contact set in series with said driving solenoid,
 (c) means for opening said contact set during said rotary step of said wiper assembly,
the arrangement being such that said uniselector is self-driving.

References Cited
UNITED STATES PATENTS

| | | | |
|---|---|---|---|
| 840,516 | 1/1907 | Rennert | 335—123 |
| 2,892,059 | 6/1959 | Keirans | 335—140 |
| 2,912,543 | 11/1959 | Hawkins | 335—140 |
| 2,957,966 | 10/1960 | Bennett | 335—123 |

BERNARD A. GILHEANY, *Primary Examiner.*

H. BROOME, *Assistant Examiner.*